US005685331A

United States Patent [19]
Westermeyer

[11] Patent Number: 5,685,331
[45] Date of Patent: Nov. 11, 1997

[54] OIL LEVEL REGULATOR

[75] Inventor: Gary W. Westermeyer, Bluffs, Ill.

[73] Assignee: AC & R Components, Inc., Chatam, Ill.

[21] Appl. No.: 359,561

[22] Filed: Dec. 20, 1994

[51] Int. Cl.$^6$ .......................... F16K 31/18; F16K 33/00; F01M 11/12; F25B 31/00
[52] U.S. Cl. ................ 137/426; 62/192; 62/468; 137/430; 137/434; 137/559; 184/103.2
[58] Field of Search ...................... 137/386, 426, 137/428, 429, 430, 433, 442, 443, 444, 192, 202, 434, 551, 559; 417/228; 62/84, 125, 192, 194, 468, 469; 184/103.2

[56] References Cited

U.S. PATENT DOCUMENTS

| | | | |
|---|---|---|---|
| 453,069 | 5/1891 | Vosburgh | 137/444 |
| 458,787 | 9/1891 | Hatch | 137/429 |
| 1,065,565 | 6/1913 | Trist | 137/430 |
| 1,200,161 | 10/1916 | Boozer | 137/192 |
| 1,246,079 | 11/1917 | Fox | 137/426 |
| 1,330,236 | 2/1920 | Burton | 137/428 |
| 1,368,364 | 2/1921 | Skuttle | 137/443 |
| 1,440,199 | 12/1922 | Wissing | 137/426 |
| 1,557,618 | 10/1925 | Ritter | 137/430 |
| 1,567,816 | 12/1925 | Rayfield | 137/428 |
| 1,679,949 | 8/1928 | Slagel | 137/443 |
| 1,686,296 | 10/1928 | Skuttle | 137/443 |
| 1,695,705 | 12/1928 | Ball et al. | 137/430 |
| 1,758,068 | 5/1930 | Winfield | 137/429 |
| 1,803,479 | 5/1931 | Mc Alear | 137/428 |
| 1,896,421 | 2/1933 | Quivey | 137/430 |
| 2,106,512 | 1/1938 | Woolley | 137/202 |
| 2,172,647 | 9/1939 | Widman | 137/426 |
| 2,181,956 | 12/1939 | Woolley | 137/426 |
| 2,250,130 | 7/1941 | May | 137/192 |
| 2,276,136 | 3/1942 | Wooley | 137/202 |
| 2,821,207 | 1/1958 | Linkert | 137/426 |
| 2,827,073 | 3/1958 | Owens | 137/426 |
| 3,010,475 | 11/1961 | Kittler | 137/426 |
| 3,018,787 | 1/1962 | Kirk, Jr. | 137/202 |
| 4,182,364 | 1/1980 | Gilbert | 137/426 |
| 4,428,208 | 1/1984 | Krause | 137/426 |

FOREIGN PATENT DOCUMENTS

| | | | |
|---|---|---|---|
| 138464 | 2/1920 | United Kingdom | 137/430 |
| 169936 | 6/1921 | United Kingdom | 137/430 |

*Primary Examiner*—George L. Walton
*Attorney, Agent, or Firm*—Hill, Steadman & Simpson

[57] ABSTRACT

An oil level regulator is provided for controlling the oil level in the crankcase of one or more refrigeration compressors or the like. The regulator has a closed chamber for containing the oil. An inlet valve assembly extends into the chamber and includes a float-controlled valve for introducing liquid into the chamber as necessary to maintain the oil level in the chamber and compressor crankcases. The inlet valve assembly includes a vertically telescoping piston for adjusting the float valve and the oil level regulator in the regulator chamber. The piston is moveable from outside the chamber in response to rotation of a concentric stem having a bore through which oil flows into the chamber. The float valve includes a lever bracket which extends horizontally across the chamber to contact a top of a float ball. The lever bracket pivots to cause side-to-side motion of a valve needle against a valve seat to control oil flow into the chamber.

5 Claims, 3 Drawing Sheets

OIL LEVEL REGULATOR

BACKGROUND OF THE INVENTION

The present invention generally relates to a fluid level regulators. More particularly, the present invention relates to an oil level regulator for controlling the oil level in a compressor crankcase.

Oil level control systems and regulators are generally known for controlling the oil level in a compressor crankcase. For example, U.S. Pat. No. 2,246,244 discloses a prior oil level control system for a refrigeration compressor. An oil level regulator is desirably capable of adjusting the oil level of the associated crankcase within predetermined oil level limits. The oil regulator disclosed in the aforementioned patent is not adjustable.

Adjustable regulators are generally known. U.S. Pat. No. 4,428,208, incorporated herein in its entirety, relates to such a device. That device includes a float which is connected at its side to a pivotable lever which is disposed generally vertically. Responsive to the oil level, the float travels along an arc, the float motion being constrained by the attached lever. The lever is operable to open or close a valve to control a flow of oil through an inlet. The inlet includes a vertically adjustable piston to which the valve, lever and float assembly are attached. This assembly is adjustable with a separate adjustment pin which extends vertically through the top of the regulator housing to the valve. The pin is threaded to the valve so that rotation of the pin from outside the regulator causes vertical adjustment of the valve assembly. Unfortunately, the regulator of U.S. Pat. No. 4,428,208 is operable within only a designed oil pressure range, for example, 0–30 psi or 30–90 psi. Also, because the float has an amount of horizontal travel along its arc, the width of the conventional regulator must be sized accordingly.

Therefore, it is desirable to provide a level-adjustable regulator which is operable within a wide range of fluid pressures, reducing the number of necessary regulator models, and costing less to manufacture. Furthermore, a regulator design is desirable which is compact and simple to adjust.

SUMMARY OF THE INVENTION

The present invention provides an improved oil level regulator which maintains a selected oil level in a crankcase and which is capable of rapid and easy adjustment to vary the selected oil level. To this end, in an embodiment, a liquid level regulator is provided having a chamber for containing the liquid. A float which is buoyant relative to the liquid is disposed in the chamber. A valve controls an inlet flow of the liquid into the chamber. A pivotal lever bracket is operable to open and close the valve, the lever bracket extending generally horizontally across the chamber and contacting a top of the float so that substantially vertical motion of the float causes the lever bracket to pivot.

In an embodiment, the float is moveable vertically within the chamber, but the float's horizontal motion is substantially restricted due to the compact shape of the chamber.

In an embodiment, a first end of the lever bracket pivots on the valve near one side of the chamber and a second end of the lever bracket contacts the float generally centrally within the chamber.

In an embodiment, the valve includes a valve seat member having a bore through which the liquid is supplied. Also, a needle is slidable within the valve seat member. The needle has a tapered tip sealable against a valve seat at an end of the bore. The bracket lever is pivotally connected to the valve seat member and the bracket lever is also pivotally connected to the needle so that pivotal motion of the bracket lever causes a sliding motion of the needle.

In an embodiment, the needle is disposed generally horizontally.

In an embodiment, a generally tubular passage member extends into the chamber. The passage member has a fitting for receiving a supply of the liquid. A generally tubular stem is concentrically disposed and rotatable within the passage member. The stem has a bore in communication with the fitting. A top of the stem is accessible from outside the chamber. Furthermore, a generally tubular piston is threaded to the stem, and the valve seat member is secured to the piston for vertical adjustment in response to rotation of the stem. The valve seat member receives a supply of the liquid through the piston.

In an embodiment, a removable cap is secured to the passage member over the top of the stem.

In an embodiment, the chamber is defined by a generally cylindrical shell, a lower end cap closure secured to a lower end of the shell and an upper end cap closure secured to an upper end of the shell.

In an embodiment, a sight glass is provided in the shell so that the level of liquid in the chamber is observable.

In an embodiment, a discharge tube extends from the shell and a rod is mounted interiorly of the shell adjacent the discharge tube to prevent the float from blocking flow through the discharge tube.

Therefore, an advantage of the present invention is to provide an improved fluid pressure regulator which provides a greater range of oil pressure compatibility.

Another advantage of the present invention is to provide a regulator which is compact.

A further advantage of the present invention is to provide a fluid level regulator which is adjustable to vary the level of fluid, such as oil.

Yet another advantage of the present invention is to provide a fluid level regulator which may be adjusted during normal compressor system operation, eliminating a need to shut down the system to accomplish the adjustment.

Still further, an advantage of the present invention is to provide a fluid level regulator which can be adjusted with common tools.

Additional features and advantages of the present invention are described in, and will be apparent from, the detailed description of the presently preferred embodiments and from the drawings.

BRIEF DESCRIPTION OF THE DRAWINGS

FIG. 4 illustrates an enlarged side section of the level-adjustable inlet valve assembly of the embodiment illustrated in FIG. 2.

DETAILED DESCRIPTION OF THE PRESENTLY PREFERRED EMBODIMENTS

Figure 1:
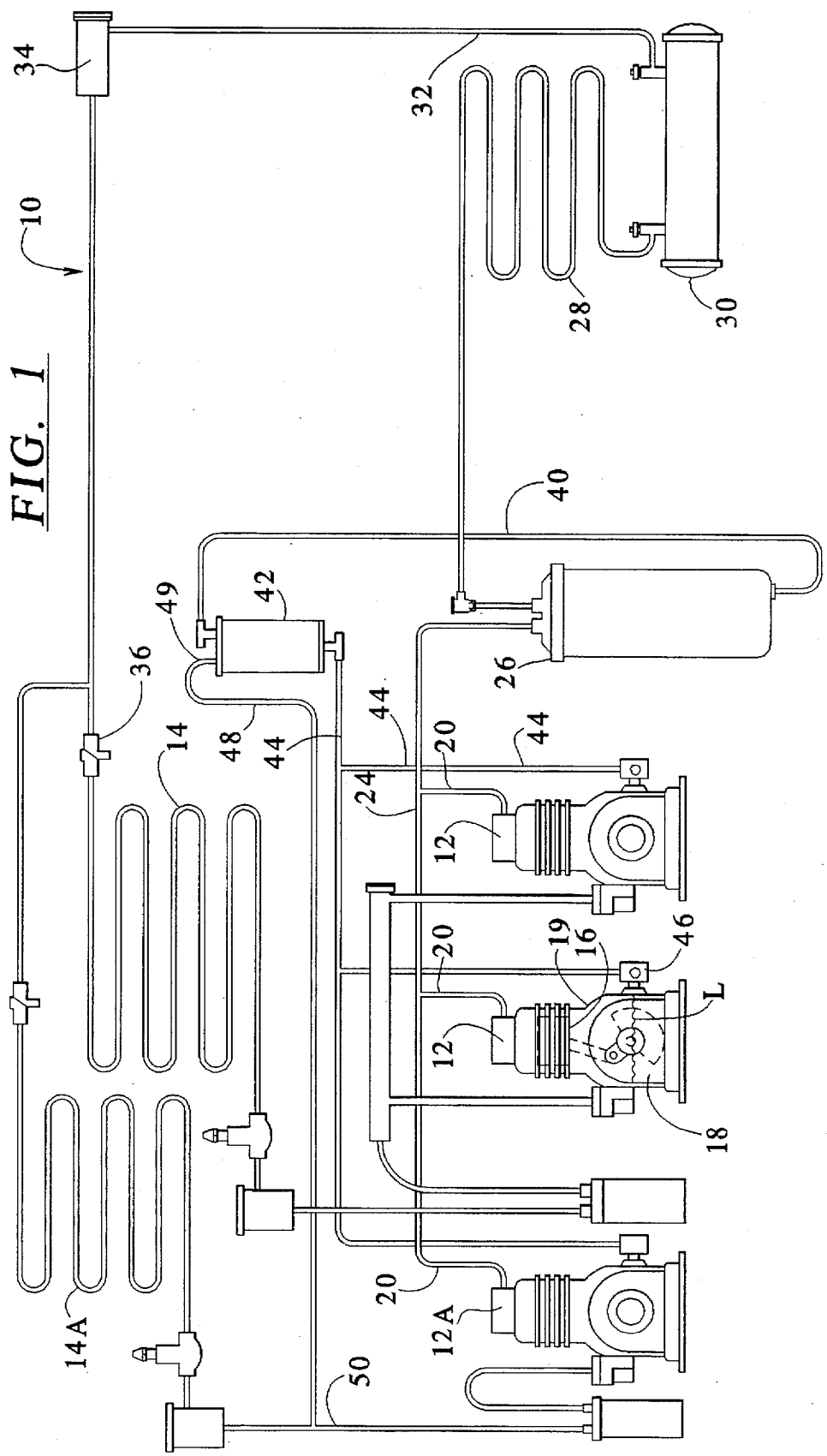
FIG. 1 illustrates a refrigeration system incorporating an oil level regulator embodying the principles of the present invention.

A standard refrigeration system 10 is illustrated in FIG. 1. As shown, one or more compressors 12 are used to compress a refrigerant gas after that gas has expanded in an evaporator 14. A system is possible which has only one compressor. Each compressor 12 has a reciprocating piston 16. Oil 18 is supplied to a crankcase 19 of the compressor 12 in order to lubricate moving components of the compressor 12 and to enhance sealing of the piston for efficient compressing.

During operation of the compressor 12, the oil becomes atomized and mixed with the refrigerant as the mixture leaves through an exit conduit 20. In an embodiment where there are multiple compressors in a parallel arrangement, as illustrated in FIG. 1, the mixture passes into a manifold 24 which communicates with additional compressors 12.

Oil is not a refrigerant, and the presence of oil in the refrigerant decreases the system efficiency. Therefore, an oil separator 26 is provided in the line between the compressor 12 and a condenser 28, to remove oil from the refrigerant gas. Refrigerant gas flowing into the condenser 28 is cooled, condensing into a liquid which is captured in a receiver 30. The cooled refrigerant liquid then flows through a conduit 32, through a filtered dryer 34 and through an expansion valve 36 to the evaporator 14. In the evaporator 14, the liquid refrigerant evaporates, absorbing heat energy. Consequently, an area associated with the evaporator is cooled. The refrigerant gas then flows through a conduit 38 to return to the compressors 12. More than one evaporator 14, 14A may be provided in an embodiment wherein one or more satellite compressors 12A are provided.

Oil removed from the refrigerant by the oil separator 26 is directed through a conduit 40 to an oil reservoir 42. From the reservoir 42, the oil is supplied through conduits 44 to the compressors 12. An oil level regulator 46 associated with each compressor 12 introduces a proper amount of oil to the corresponding compressor. The oil reservoir 42 is provided with a vent line 48 having a valve 49 to reduce the pressure within the oil reservoir to a level just slightly exceeding that present in a gas inlet line 50. This arrangement provides a slight positive pressure to ensure an adequate oil supply from the reservoir 42 to the oil level regulators 46.

The regulator 46 of the present invention controls the oil level in each crankcase 19 by means of a float operated valve (described in detail below in connection with FIGS. 2–4). When an adequate oil level L is present in the compressor crankcase, the regulator 46 closes oil flow from the conduit 44, providing no additional oil. However, when the oil level L drops below a desired level, the regulator 46 opens a flow of oil from the conduit 44 into the crankcase 19 until an adequate level L is restored. Oil from the oil reservoir 42 is thus returned into the crankcase 19.

Figure 3:
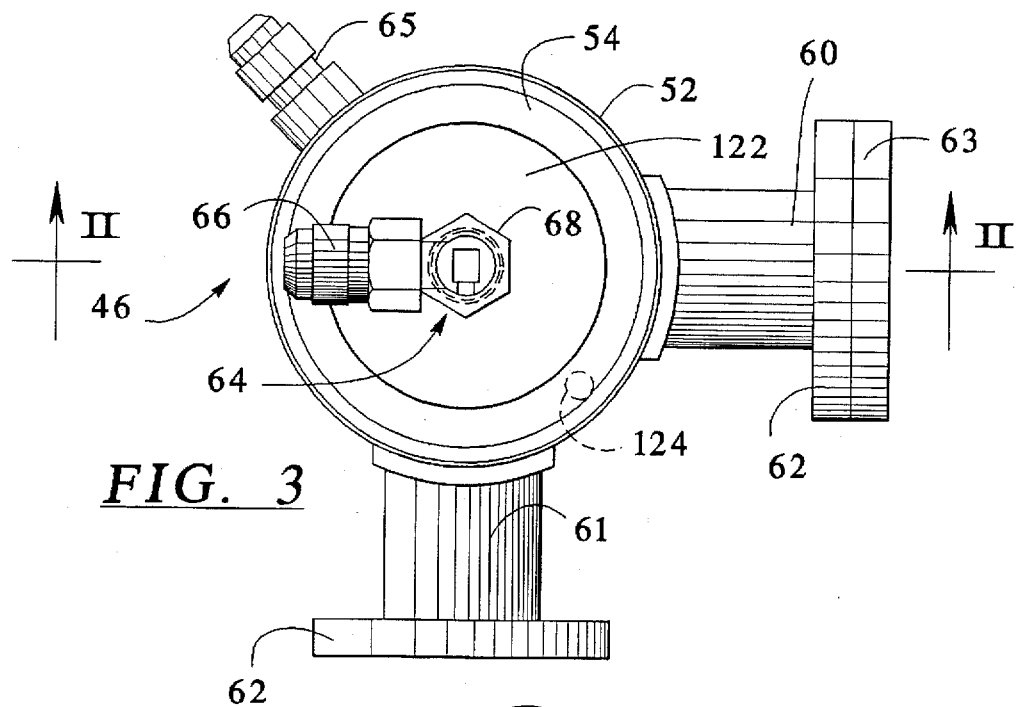
Figure 2:
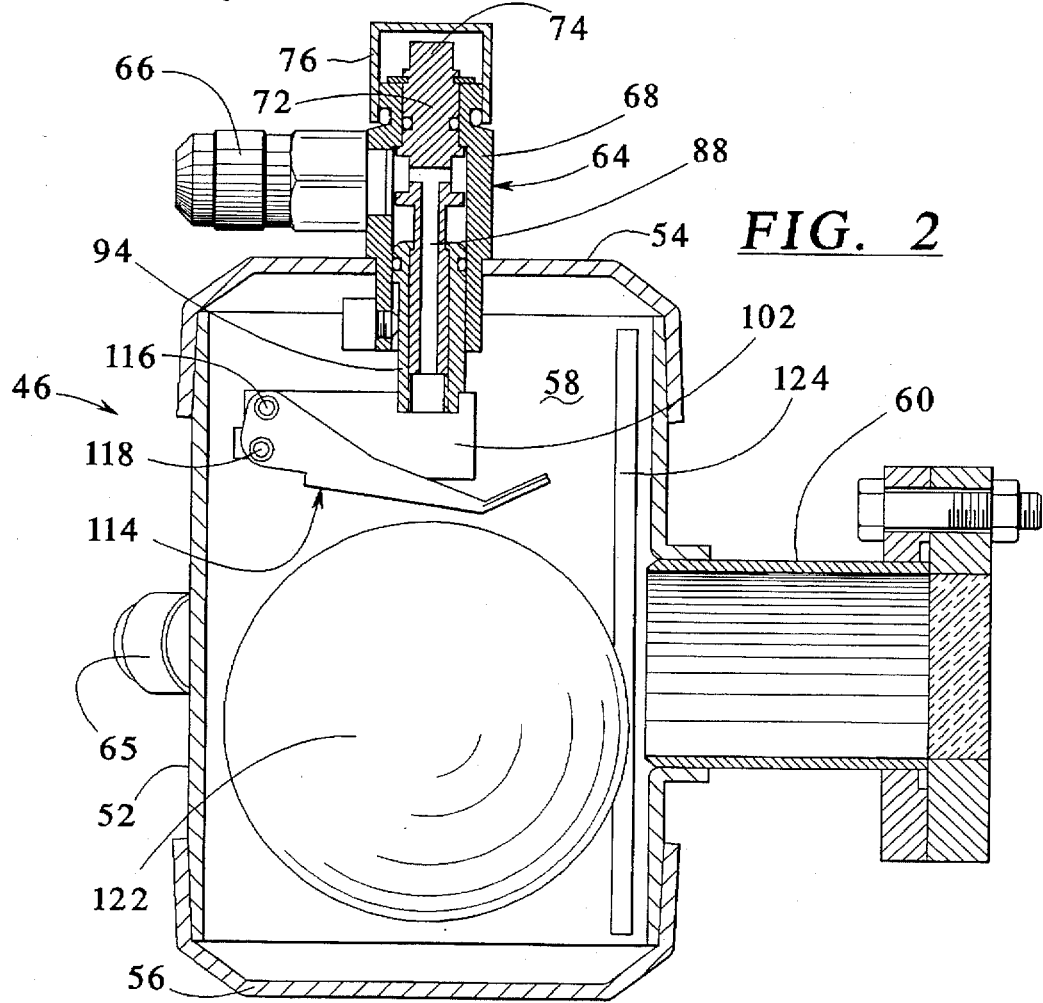
FIG. 2 illustrates a sectional side view of a regulator according to the present invention taken generally along line II—II of FIG. 3.

Turning to FIGS. 2 and 3, the regulator 46 is illustrated in greater detail. The regulator 46 preferably has a hollow cylindrical shell 52 which is closed at its ends by an upper end cap closure 54 and a lower end cap closure 56, defining a liquid containing chamber 58. The end caps 54, 56 may be affixed to the shell 52 by any suitable means such as soldering or welding.

A pair of flanged discharge tubes 60, 61 extend from the shell 50, at approximately 90° to one another, providing communication from the chamber 58 to the compressor crankcase 19 (FIG. 1) through a selected one of the discharge tubes. The discharge tubes 60, 61 are affixed to the shell 52 by a suitable means, such as welding. In addition, each discharge tube includes a flange 62 at a free end thereof. A sight glass 63 may be secured to one of the flanges 62 not connected to the crankcase 19, and the sight glass 63 is also in communication with the chamber 58 and is positioned at a vertical height to enable the visual sighting of the oil level L (FIG. 1) in the chamber 58 from the exterior of the regulator 46. Such viewing allows an operator to monitor the oil level in the regulator 46 and associated crankcase 19 (FIG. 1) during normal system operation, indicating whether an adjustment of the oil level L is necessary, as described below. An equalization fitting 65 may also be provided in communication with the chamber 58 to optionally provide equalization of oil levels between multiple oil compressor crankcases as is known.

Figure 4:
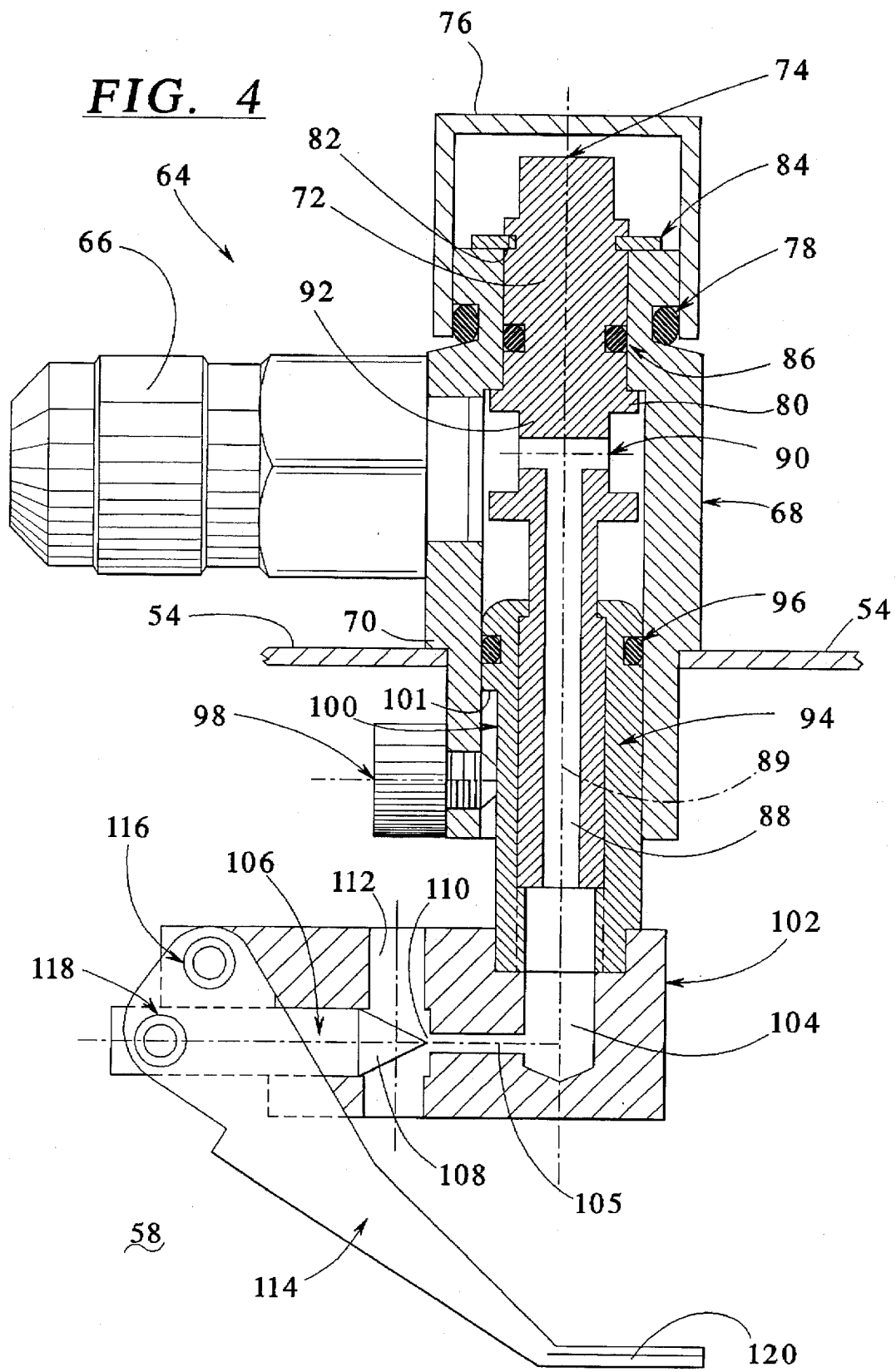
FIG. 4 illustrates a top plan view of the regulator of FIG. 2.

A level-adjustable inlet valve assembly 64 is illustrated in FIGS. 2 and 4. The valve assembly 64 has a fitting 66 which is adapted to be coupled with the conduit 44 (FIG. 1) to receive oil therefrom. The fitting 66 extends generally horizontally from and is secured to a generally cylindrical passage member 68. The passage member 68 extends centrally through and is secured to the upper end cap closure 54. An annular ridge 70 on an exterior of the passage member 68 is formed by a reduced diameter portion thereof to position the passage member 68 against the end cap 54. The passage member 68 is generally hollow.

An elongated stem 72 is disposed concentrically within the passage member 68. An upper portion and a lower portion of the stem 72 are closely received by the passage member 68, but are of such a fit that the stem 72 is rotatable relative to the passage member 68. A top 74 of the stem 72 extends through the upper end of the passage member 68 and is configured to be engageable with a standard tool. For instance, the top 74 can be provided with a screwdriver slot or with hexagonal sides for engagement with a standard wrench. To prevent the introduction of contaminants during shipping and storage, or even during use between adjustments, a protector cap 76 is preferably disposed over the stem top 74 and threaded onto the passage member 68. The protector cap 76 is removed at the time of adjustment. Accordingly, a cap O-ring 78 is preferably disposed around the passage member to seal between the cap 76 and the passage member 68.

Referring to FIG. 4, the stem 72 has an annular ridge 80 which rotatably abuts the interior of the passage member 68. Just below the top 74 of the stem 72, an annular groove 82 in the stem 72 receives a retaining ring 84 which is disposed against an end of the passage member 68 to hold the stem 72 in place. At least one O-ring 86 is preferably recessed in the upper portion of the stem 72 to provide sealing between the stem 72 and the passage member 68. A bore 88 is disposed generally along an axis 89 through the lower portion of the stem 72. The bore 88 has a horizontal portion 90 which opens at a reduced-diameter section 92 of the stem 72 adjacent to the oil inlet fitting 66. Thus, oil can flow around the section 92 of the stem so that the bore 88, 90 is in communication with the fitting 66 regardless of the stem's rotational position.

Also shown in FIG. 4, a generally tubular piston 94 is provided between a lower portion of the passage member 68 and the stem 72. The piston 94 is closely received within passage member 68 and is telescopically slidable therein along the axis 89. At least one O-ring 96 is preferably recessed in the piston 94 to form a seal between the piston 94 and the passage member 68.

An interior of the piston 94 is threaded to the stem 72. Rotation of the stem 72 causes vertical telescoping movement of the piston 94 relative to the passage member 68. A set screw 98 extends through the passage member 68 so that a vertical groove 100 in the piston 94 is guided along the set screw 98. The set screw 98 does not fit tightly against the groove 100; therefore the piston 94 can move vertically but not rotationally. The groove 100 stops short of the top of the piston 94 (actually even below the O-ring 96) thus providing an end wall 101 which will abut against the set screw 98, preventing the piston 94 from being lowered so far in the passage member 68 so as to drop out of the passage member.

Still referring to FIG. 4, a valve seat member 102 is secured to the bottom of the piston 94 within the chamber 58. The valve seat member 102 also has a large vertical bore 104 which is in communication with the bore 88 of the stem 72 through hollow piston 94. The vertical bore 104 communicates with a smaller horizontal bore 105. A valve needle 106 is slidable within the valve seat member 102, preferably horizontally. The valve needle 106 has a tapered tip 108 to form a seal when positioned against a valve seat 110 at the opening of the bore 105. The bore 105 opens at seat 110 into an outlet 112 in communication with the chamber 58.

A lever bracket 114 is pivotally connected to the valve seat member 102 with a pin 116 at a position adjacent to the valve needle 106. The lever bracket 114 is also pivotally connected via a pin 118 to an end of the needle 106 opposite the tapered tip 108. The lever bracket 114 extends downwardly and horizontally so that a float contact end 120 of the lever bracket 114 is generally positioned centrally within the regulator 46. When the lever bracket 114 is in a lower position, allowed by the float moving downwardly with a lowering oil level, the tapered tip 108 of the valve needle 106 is retracted away from the valve seat 110, allowing flow communication from the bore 104 to the chamber 58. The pressure of oil in bore 105 may actually push the needle 108 away from the seat 110 when the float moves downwardly away from the bracket 114. This pressure, coupled with the weight of the bracket 114 will permit the needle to move sufficiently away from the seat 110 to provide a good flow of oil to the chamber 58. When the lever bracket 114 is pivoted to a raised position, as the float moves upwardly with the rising oil level, the needle tip 108 is pressed against and seals against the valve seat 110, shutting off flow communication from the bore 105 to the chamber 58.

Turning back to FIGS. 2 and 3, a float ball 122 is provided as the float within the chamber 58. The interior diameter of the shell 52 is sized slightly larger than the float ball 122, allowing a compact overall design. A vertical rod 124 is secured within the shell 52 between the discharge tubes 60, 61 to prevent the float ball 122 from seating against and blocking flow through either discharge tube 60, 61. The float ball 122 is buoyant relative to the oil.

During operation, oil partially fills the chamber 58 to a level, which is the same as the crankcase oil level L of FIG. 1. The lever bracket 114 contacts against a generally central, top point of the float ball 122. Thus, the lever bracket 114 is pivoted with the buoyant force of the float ball 122 in response to changes in the oil level L. Accordingly, the vertical movement of the float ball 122 is operable to cause side-to-side horizontal motion of the needle 106 against the valve seat 110. The vertical position of the valve seat member 102 is set so that a desired level L is maintained. At the desired level L, the float ball 122 holds the lever bracket 114 up, preventing the flow of oil into the chamber 58. However, when the level L drops, the float ball 122 and lever bracket 114 also drop, retracting the needle 106 from the valve seat 110 and opening the flow of oil from the inlet fitting 66 to the chamber 58 until the desired level L is restored.

Sometimes adjustment of the set oil level is desired. The present invention provides easy adjustment. Referring to FIGS. 2 and 4, because the valve seat member 102 is secured to the piston 94, the valve seat member 102 with the associated needle 106 and lever bracket 114 vertically move with the piston 94. As described above, rotation of the stem 72 causes the piston 94 to move vertically. Thus, the set oil level is adjustable up or down by removal of the protective cap 76 and rotation of the stem 70.

In comparison with the oil level regulator disclosed in U.S. Pat. No. 4,428,208, the present invention allows for a lower cost regulator due to a more compact structure for the shell 52 since horizontally movement of the float is confined rather than required. Also, since the float ball 122 merely presses against the lever arm 114 rather than being attached to it, less assembly time is required.

Further, because the lever arm 114 is arranged generally horizontally, it moves directly with the changing oil level rather than a much less sensitive movement as disclosed in U.S. Pat. No. 4,428,208 where the lever arm is arranged substantially vertical and the oil level change causes arcing movement of the float, having both a horizontal and a vertical component. The present arrangement allows for control of the needle 108 against the seat 110 over a much greater oil pressure range, such as 0–90 psi, by the use of a single sized bore 105. Thus all oil regulators in this pressure range can be made identically further reducing manufacturing and inventory costs.

Finally, by making the adjusting elements concentric with the flow passage, fewer parts, fewer seal areas, and a more compact arrangement further allow for cost and material savings.

It should be understood that various changes and modifications to the presently preferred embodiments described herein will be apparent to those skilled in the art. For example, the float 122 or the shell 52 could be shaped differently. Also, the rod 124 could be any other piece which displaces the float 122 from obstructing the discharge tube. Such changes and modifications may be made without departing from the spirit and scope of the present invention and without diminishing its attendant advantages. It is, therefore, intended that such changes and modifications be covered by the appended claims.

What is claimed is:

1. A liquid level regulator comprising:

a compact chamber for containing liquid;

a generally tubular passage member having a fitting outside of said chamber adapted to receive a supply of said liquid, said passage member extending into said chamber;

a generally tubular stem rotatably disposed within said passage member, said stem having a top which is accessible from outside said chamber, the stem being rotatable and constrained from axial movement relative to said chamber;

a generally tubular piston threaded to said stem, said valve seat member being secured to said piston and vertically moveable therewith in response to rotation of said top, said piston being constrained in a non-rotatable manner relative to said passage member;

a low-profile float-operated valve secured to said piston for vertical movement therewith, said valve being operable to introduce a flow of said liquid into said chamber when a level of said liquid drops below a set level said valve including:

a valve seat member having a bore through which said liquid is supplied; and a needle slidable generally horizontally within said valve seat member having a tapered tip sealable against an end of said bore;

a lever bracket pivotally connected to said valve seat member and operable with said needle so that pivotal motion of said lever bracket causes sliding of said needle to open and close said valve, said lever bracket extending generally horizontally across said chamber and contacting said float so that vertical motion of said float causes said lever bracket to pivot, wherein said float is not fixed to said lever;

a passageway disposed through said stem and piston to provide communication between said fitting and said valve, said passageway supplying said valve with said flow;

wherein said chamber is shaped to substantially restrict horizontal motion of said float, and wherein rotation of said stem causes a reciprocable motion of said piston and said valve secured thereto for variably adjusting said set level within said chamber.

2. The regulator according to claim 1 wherein said stem is concentrically disposed within said passage member.

3. The regulator according to claim 1 wherein said piston is concentrically disposed between said passage member and said stem.

4. An adjustable control valve for a liquid level regulator comprising:

a body having a liquid input opening secured to a compact housing of said regulator;

a vertically adjustable member carried within said body and having a portion accessible from an exterior of said housing;

said member having a liquid passage therethrough in communication with said liquid input and having a liquid outlet opening communicating with an interior of said regulator housing; and a low-profile valve mechanism engageable with said liquid outlet opening to selectively close said outlet opening, said valve mechanism responsive to a level of liquid in said regulator housing said valve mechanism including a horizontal valve needle slidable toward and away from said outlet opening, a valve lever pivotally secured to said needle and pivotally secured to a portion of said vertically adjustable member, and a float device engagable with said valve lever and freely moveable relative thereto arranged such that vertical movement of said float device will cause a pivoting of said valve lever on said adjustable member, causing said needle to slide relative to said outlet opening;

wherein said adjustable member comprises a stem member rotatable within said body about a vertical axis, but restrained against vertical movement, and a non-rotatable reciprocable piston on which the valve mechanism is carried, said stem and piston being operably engaged such that rotational manipulation of said stem from an exterior of said body results in vertical reciprocable adjustment of said piston and said valve mechanism within said housing for variably adjusting the level of liquid within said regulator at which said valve mechanism closes said outlet opening, the housing being shaped to substantially restrict horizontal motion of the float.

5. An adjustable control valve according to claim 4, further comprising:

a sleeve member threadingly joined to said stem member and vertically slidable within said body, but restrained against rotational movement, wherein rotation of said stem member will result in vertical movement of said sleeve member.

* * * * *